Patented May 22, 1934

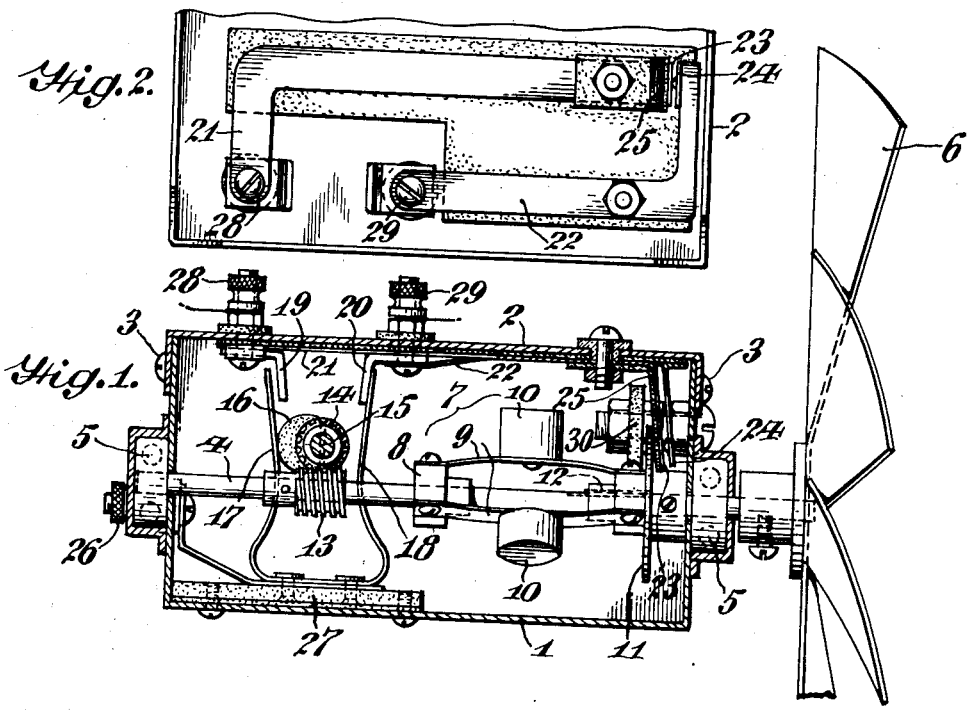

1,959,634

UNITED STATES PATENT OFFICE 1,959,634

FLASHER SWITCH

Le Roy J. Mickle, Upper Darby, Pa.

Application August 21, 1933, Serial No. 685,975

5 Claims. (Cl. 200—81)

The subject of my invention is a device for flashing or alternately turning on and off electric lamps. It is useful in connection with any electric lamps. It is particularly useful in connection with electric lamps of an automobile, such as the stop-light, direction indicating lights, or the lights which outline the dimensions of a truck. It can be used to flash the lights on the opposite sides of the vehicle alternately.

My device consists essentially of a fan adapted to be driven by a current of air such as the current of air from the cooling fan of an automobile, a shaft driven by said fan, a governor for preventing excessive speed of rotation of said shaft, a worm and wheel driven by said shaft, a cam driven by said worm and wheel, and one or more electric switches driven by said cam. My device may also include a second electric switch connected to one of the terminals of each of the first-mentioned switches on one side of the circuit so as to provide a bridge between them and located so as to be closed by said governor when said fan is stopped or is rotating at a low speed.

For a further exposition of my invention, reference may be had to the annexed drawing and specification, at the end thereof my invention will be specifically pointed out and claimed.

In the drawing:

Fig. 1 is an elevation of my device with parts in vertical cross section and parts broken away;

Fig. 2 is an inverted plan view of the top of the casing of Fig. 1;

Fig. 3 is a plan view with the cover removed and parts of the fan broken away; and Fig. 4 is a vertical cross section through the switches which will be hereinafter described.

In that embodiment of my invention chosen for illustration in the drawing, my device is shown as consisting of a casing 1 having a cover 2 adapted to be secured thereon in any convenient manner as by screws 3. The casing 1 carries a shaft 4 which may be mounted in anti-friction bearings 5 in the casing 1. At one end, the shaft 4 carries a fan 6 or similar device suitable for being driven by a current of air.

There is also mounted on the shaft 4 a governor, generally indicated at 7, which consists of a collar 8 attached to shaft 4, and bearing flexible members 9, which in turn support weights 10. Flexible members 9 carry at their opposite end a sliding collar 11 of enlarged size, which is movable axially of shaft 4 but which is fixed against rotation relative thereto by means of key 12.

There is also mounted on shaft 4 a worm 13 which serves to drive a worm-wheel 14, which in turn drives a counter-shaft 15. A cam 16 is mounted on counter-shaft 15 between two movable switch members 17 and 18, respectively. As is best seen in Figs. 1 and 4, movable switch members 17 and 18 co-operate with stationary switch contacts 19 and 20, respectively. Contacts 19 and 20, as is best seen in Fig. 2, are connected by conductors 21 and 22 with the contacts 23 and 24 of a second switch. This second switch 23—24 is located so as to be actuated by collar 11 through insulating element 25, when fan 6 is stopped or is turning at slow speed.

One circuit in which my device may be used is indicated in Fig. 4. Current is led from battery B to terminal 26 connected to movable switch members 17 and 18, which are insulated from casing 1 by means of insulation 27. Movable switch members 17 and 18 are normally in contact with their respective stationary contacts 19 and 20, unless one of the switch members 17 or 18 is moved out of contact by means of cam 16. Terminals 28 and 29 are respectively in contact with stationary contacts 19 and 20. One or more lamps L may be connected to terminals 28 and 29, so that the circuits of the lamps L are interrupted by the switches 17—19 and 18—20, respectively. Stationary contacts 19 and 20 are connected by conductors 21 and 22 with the contacts 23—24 of a second switch. Conductors 21 and 22 and switch 23—24 thus forms a bridge or circuit between one of the terminals of each of switches 17—19 and 18—20 on one side of the circuit. Second switch 23—24 is located so as to be closed by collar 11 when fan 6 is stopped or moving slowly. This provides a means whereby all the lamps L are lighted when the fan 6 is stopped or rotating slowly, which occurs when the automobile or other vehicle is stopped or moving at slow speed.

The operation of my device is as follows: The device is located in an automobile or other vehicle so that fan 6 is in a position to be actuated by a current of air such as the current of air produced by the cooling fan of an automobile. Rotation of fan 6 rotates shaft 4 and throws out weights 10 of governor 7. If the speed of shaft 4 increases, weights 10 draw collar 11 toward the left as seen in Figs. 1 and 3, and, if the speed becomes excessive, draw collar 11 into contact with brake 30, so that the speed of shaft 4 is prevented from reaching an excessive rate. This prevents shaft 4 from being rotated so rapidly as to cause such a quick flashing of switches 17—19 and 18—20 as to give the impression of a continuous illumination of the lamps L connected thereto. Shaft 4 drives worm 13, worm-wheel 14, counter-shaft 15, and cam 16 mounted thereon. As is best seen in Fig. 4, cam 16 alternately actuates switches 17—19 and 18—20, thereby producing a flashing effect of the lamps L connected in series with the switches. This flashing effect serves to attract the attention of persons observing the movement of the vehicle, such as the drivers of adjacent vehicles. To attract this attention, it is necessary that the flashing be at a visible rate and be not so rapid as to give the impression of continuous illumination of lamps L. This is the reason for the provision of governor 7, which prevents too rapid rotation of shaft 4 and consequent too rapid actuation of switches 17—19 and 18—20.

I do not intend to be limited save as the scope of the prior art and the attached claims may require.

I claim

1. A flasher comprising in combination, a fan, a shaft driven by said fan, a governor mounted on said shaft to prevent excessive speed thereof, and a switch actuated by rotation of said shaft.

2. A flasher comprising in combination, a fan, a shaft actuated by said fan, a governor mounted on said shaft to prevent excessive speed of said shaft, a cam driven by said shaft, and a switch actuated by said cam.

3. Means for alternately flashing a light on one side part of a vehicle and then on the other side part of a vehicle, said means comprising in combination at least two switches, means for opening one of said switches when the other is closed and for closing the first switch when the other is open, a fan for driving said means and of which the speed tends to vary with the speed of revolution, and a speed governor limiting the speed of the fan to prevent such operation of the switches as would give the appearance of continuous illumination.

4. Means for alternately flashing a light on one side part of a vehicle and then on the other side part of a vehicle, said means comprising in combination at least two switches, means for opening one of said switches when the other is closed and for closing the first switch when the other is open, a fan for driving said means and of which the speed tends to vary with the speed of revolution, a speed governor limiting the speed of the fan to prevent such operation of the switches as would give the appearance of continuous illumination, and an additional switch operated by the governor at slow speed or at rest of the fan and adapted to light all the lights with a steady light.

5. A flasher, comprising, in combination, a plurality of first switches connected in parallel, variable speed means for operating said switches alternately, means for preventing too rapid operation of said variable speed means, and a second switch connecting a plurality of the terminals of said first switches on one side of the circuit and closed by said means for preventing too rapid operation when said variable speed means is stopped or is operating at low speed.

LE ROY J. MICKLE.